United States Patent [19]

Slabic

[11] 4,197,600
[45] Apr. 15, 1980

[54] CAMPING BED FOR STATION WAGON

[76] Inventor: John P. Slabic, Rte. 1, Box 440, Trout Lake, Wash. 98650

[21] Appl. No.: 940,181

[22] Filed: Sep. 7, 1978

[51] Int. Cl.² .............................................. B10P 3/34
[52] U.S. Cl. ........................................ 5/118; 5/2 R; 296/167; 296/175
[58] Field of Search .......................... 224/42.43, 42.44; 108/44; 312/235, ; 5/118, 2 R, 8, 9; 296/23 R, 23 MC

[56] References Cited

U.S. PATENT DOCUMENTS

| 2,784,027 | 3/1957 | Temp | 296/23 R |
| 2,867,471 | 1/1959 | Coon, Jr. | 296/23 |
| 3,006,001 | 10/1961 | Llewellyn | 5/118 |
| 3,837,701 | 9/1974 | Curtis et al. | 296/23 MC |
| 3,946,678 | 3/1976 | Birge et al. | 296/23 MC |
| 4,108,487 | 8/1978 | Spohn | 5/118 |

Primary Examiner—Casmir A. Nunberg
Attorney, Agent, or Firm—Chernoff & Vilhauer

[57] ABSTRACT

A camping bed for station wagons is comprised of paired, upstanding frame elements which extend between the tailgate door and the rear seat of the station wagon and are separated by a spacer member at their bottom edges so that they are located against the inner side walls of the station wagon. A rear pillow, which spans between the upper edges of the frame elements is divided into front and rear portions, each of which is pivotally mounted to the frame elements by hinges. Accordingly, each portion can be independently raised for access to materials which are stored beneath it. Located beneath the rear portion, which generally covers the well of the station wagon, is a drawer unit that is slidably mounted on tracks. Therefore, by sliding the drawer unit outwardly through the station wagon tailgate door, access to the well is available. When the rear seat of the station wagon is folded forward, a front pillow spans between it and the front extremities of the frame elements so that the bed covers the entire rear end of the station wagon. A second embodiment of the bed has frame elements which are longitudinally and transversely adjustable and a spacer member which is extensible, for adjusting the bed to fit station wagons of various sizes.

8 Claims, 8 Drawing Figures

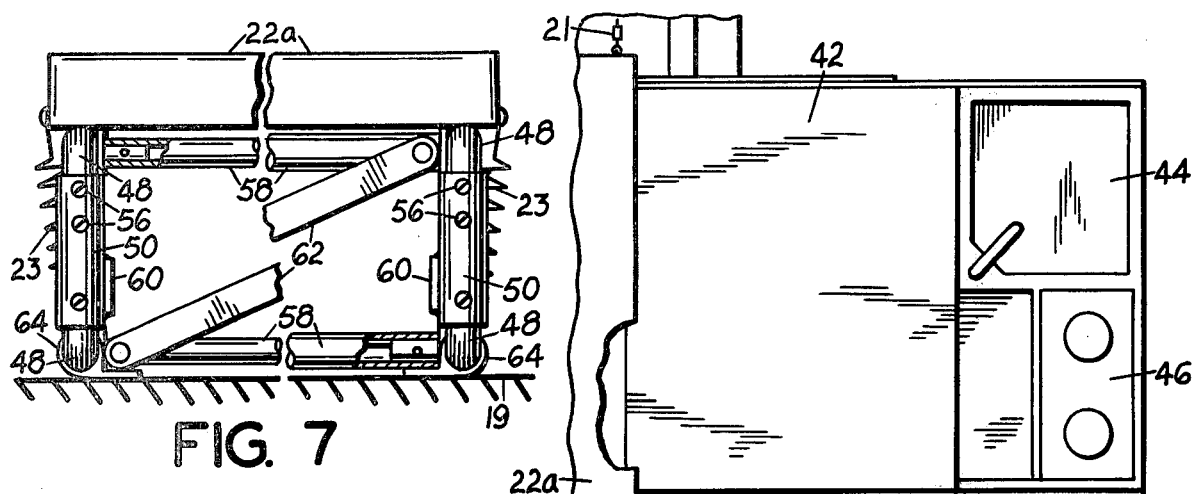
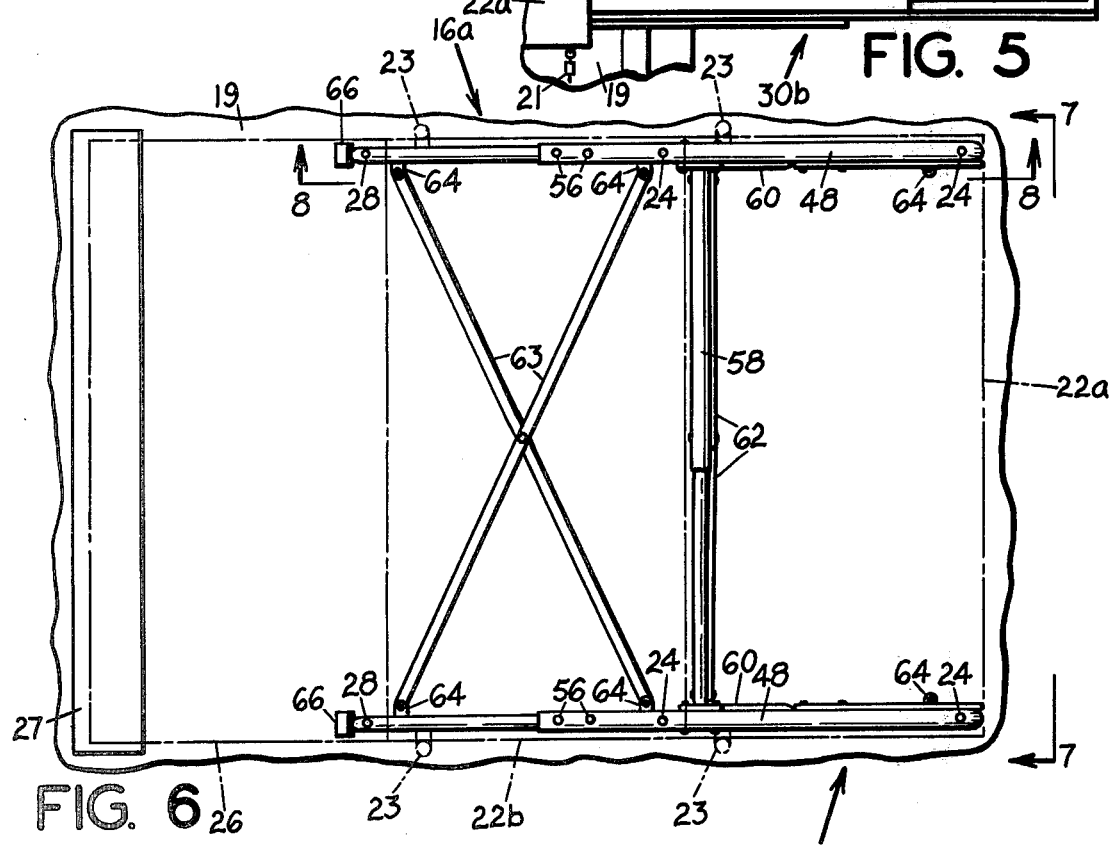
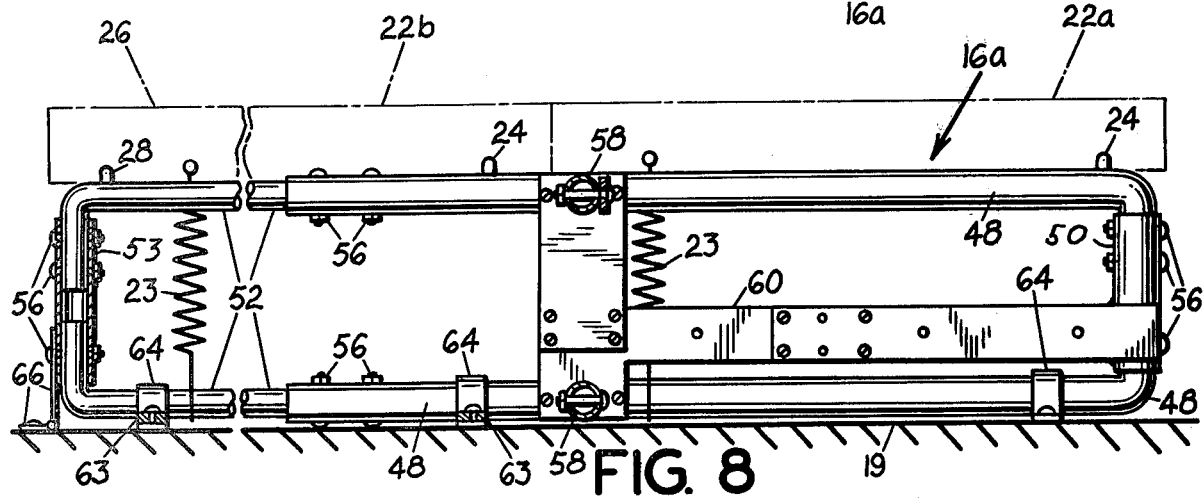

CAMPING BED FOR STATION WAGON

BACKGROUND AND SUMMARY OF THE INVENTION

This invention relates to a camping bed which removably fits in the rear portion of a station wagon.

Many beds or cots have been devised for use in automobiles, station wagons or other vehicles, however, when these devices are used in station wagons, where the bed typically occupies the same place that is occupied by the user's luggage and other camping items, their use has been severely limited. If the bed is merely a mattress or has a frame which extends completely across the floor of the station wagon, then each time the bed is to be used, the luggage and other items must be removed from the rear of the station wagon and placed elsewhere. When the bed provides an elevated platform, such as a cot, it is possible to store the items under it, however, then the bed must be removed in order to obtain access to the goods. Therefore, camping beds of this type have not gained wide spread acceptance for use in station wagons.

The bed of the present invention on the other hand, provides paired, upstanding frame elements which extend between the tailgate door and the back of the rear seat of the station wagon along each of its inner side walls. A spacer member interconnects the frame elements so that their spacing is maintained, and turn buckles releasably secure the frame elements to the floor of the vehicle. Located across the top of the frame element is a rear pillow which is divided into front and rear portions, both of which are hingedly joined to the frame elements by means of springs to provide easy access beneath them. In addition, the spacer member does not extend over the well which is located in the bottom of the station wagon, so that access is available to this area by merely lifting the rear portion of the rear pillow. The rear pillow does not cover the forward extremities of the frame elements so that a front pillow can be placed between them and the rear seat when the rear seat is folded forward, to cover the remaining area in the rear of the station wagon.

Located beneath the rear portion of the rear pillow and between the frame elements is a drawer unit which is slidingly mounted on tracks. Thus by sliding the drawer unit out through the tailgate door the well is made accessible. The drawer unit can be arranged in a manner to provide a wide variety of camping accessories or storage.

A second embodiment of the invention has frame elements which are provided with longitudinal and transverse extention means for respectively lengthening or shortening the frame elements and raising and lowering their upper edges, thereby allowing the bed to be used in station wagons of various sizes. Also this embodiment of the invention has a spacer member with spreading means for varying the amount of separation between the frame elements.

Accordingly, it is a principal object of the present invention to provide a bed for station wagons where the pillows which form the bed are raised above the floor of the station wagon, and yet are arranged to provide easy access beneath them without disruption of the bed.

It is a further object of the present invention to provide such a bed which will cover substantially the entire rear portion of the station wagon both when the rear seat is in its raised position and when it is in its lowered position.

It is a further object of the present invention to provide such a bed having a drawer assembly which can be opened outwardly of the tailgate door of the station wagon so that items stored above the well in the floor of the station wagon can be quickly moved to provide access to the well.

It is a still further object of the present invention to provide such a bed which is adjustable for accommodating different sizes of vehicles.

The foregoing objectives, features and advantages of the present invention will be more readily understood upon consideration of the following detailed description of the invention taken in conjunction with the accompanying drawing.

BRIEF DESCRIPTION OF THE DRAWING

FIG. 5 is a plan view showing yet another embodiment of the drawer unit.

FIG. 6 is a plan view of another embodiment of the bed of the present invention.

FIG. 7 is a foreshortened end elevational view taken along the line 7—7 in FIG. 6.

FIG. 8 is a sectional view taken along the line 8—8 in FIG. 6.

DETAILED DESCRIPTION OF THE INVENTION

Figure 1:
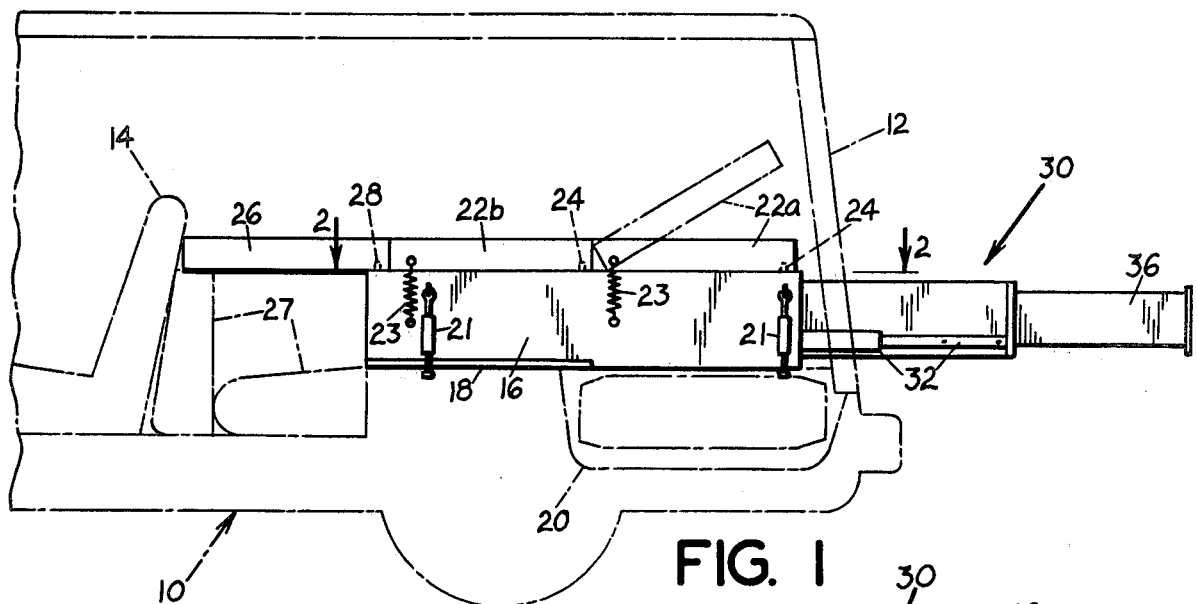
FIG. 1 is a side elevational view showing the camping bed of the present invention installed in a station wagon.
Figure 2:
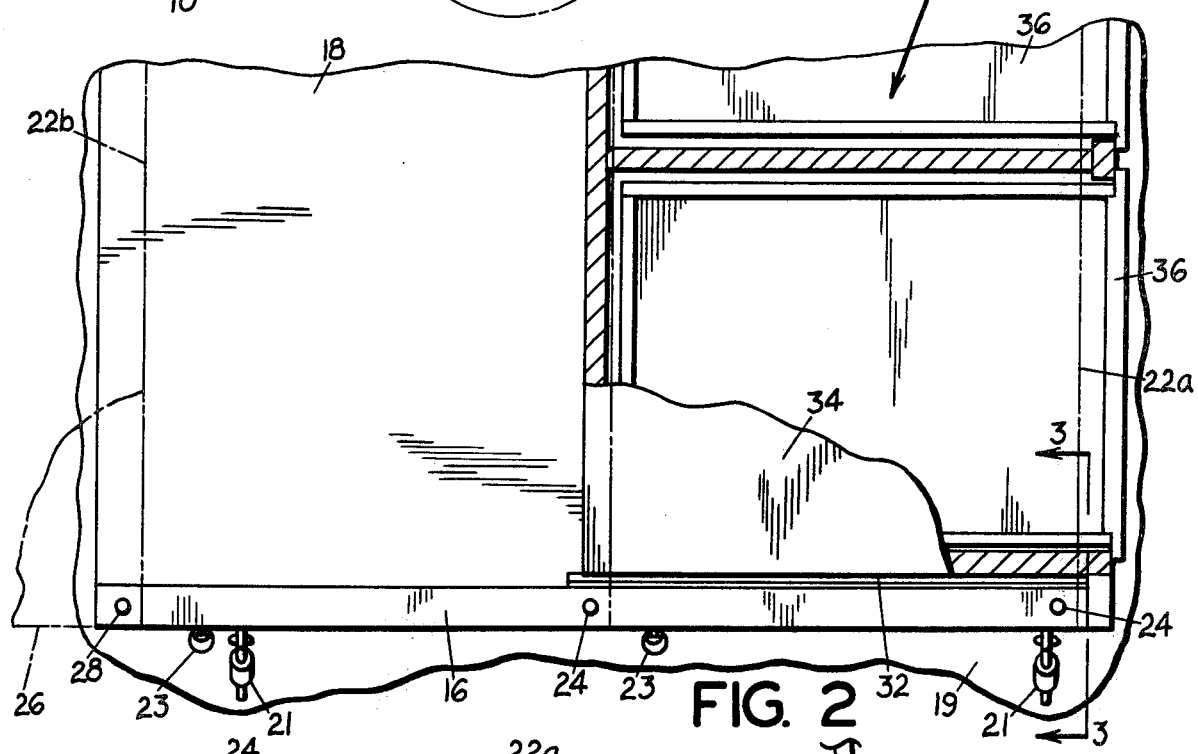
FIG. 2 is a fragmentary plan view, partially broken away, of the bed of FIG. 1.

Referring to FIG. 1 of the drawings the bed of the present invention is positionable in the rear portion of a station wagon 10, and potentially extends from the tailgate door 12 to the back surface of the front seat 14, across the entire transverse extent of the vehicle.

The bed comprises paired, spaced-apart upstanding frame elements which are shown in the embodiment illustrated as being elongate, rectangularly cross-sectioned beams 16. The beams extend between the tailgate door and the back of the rear seat 27 of the wagon and are located adjacent to its inner side walls 17. The frame elements are secured to the floor 19 of the station wagon by means such as turn buckles 21 so that they are held rigidly in place and yet can be easily removed if desired. While the embodiment illustrated shows the turn buckles as being attached directly to the floor, clevises can be used for this purpose.

Interconnecting the frame elements at their bottom edges is a spacer member 18 which is illustrated as being a thin planar element. The spacer element is supported by the floor of the station wagon and is truncated so that it does not cover the well 20 which is located below the rear portion of the floor on most station wagons.

Located on top of the frame elements is a rear pillow 22. In the embodiment illustrated the rear pillow is divided into a rear portion 22a and a front portion 22b. Accordingly, only the rear portion has to be lifted to obtain access to the well 20. To facilitate access beneath the rear pillow, both portions of it are hingedly attached to the frame elements so that they can be pivoted upwardly as shown in phantom line in FIG. 1. However, since the rear pillow portions must nest in close proximity to one another, a rigid hinge would not work for this purpose. As a result, the hinges comprise elastically extensible springs 23 which extend between the rear pillow portions and the frame elements. In addition, pins 24 which protrude from the frame elements, fit into mating openings 26, FIG. 3, located in the rear pillow portions, to align them and to prevent their becoming displaced.

The rear pillow is positioned on the frame elements so that it does not cover their forward extremities. Therefore, when the rear seat 27 is folded forward (as shown in FIG. 1) a front pillow 26 covers the rest of the rear end of the station wagon (up to the back surface of the front seat 14) by spanning between the uncovered forward extremities of the frame elements and the folded rear seat. While the front pillow is not hinged it is located by pins 28 in the same manner as the rear pillow.

Figures 3, 4:
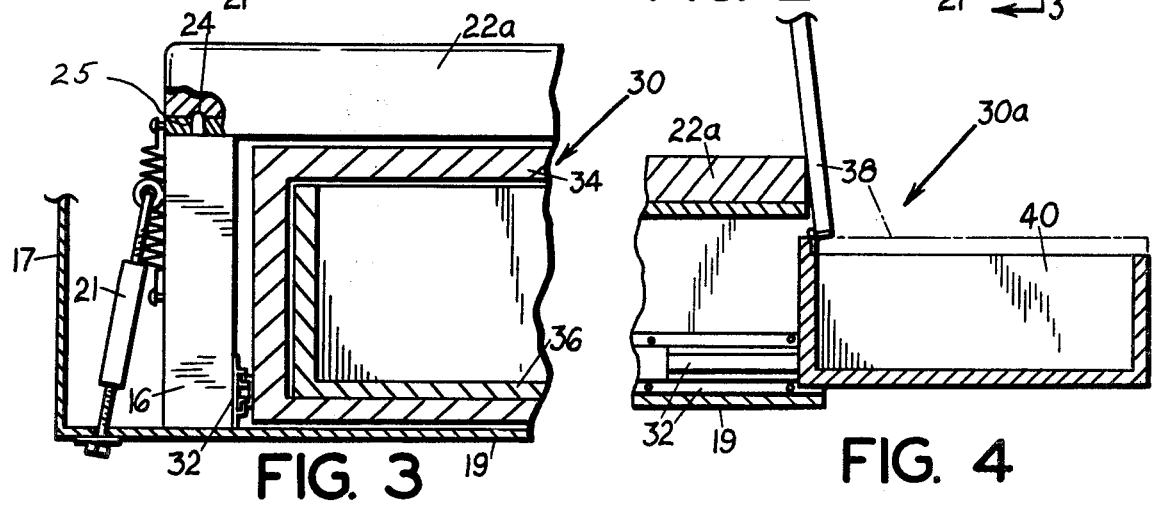
FIG. 3 is a sectional view taken on the line 3—3 of FIG. 2.
FIG. 4 is a fragmentary sectional view showing an alternate embodiment of the drawer unit which is a part of the camping bed.

Located beneath the rear pillow and between the frame elements is a drawer unit 30 which is slidingly mounted on tracks 32, FIG. 3. The drawer unit is movable between a retracted position, wherein it lies between the frame elements, and an extended position, where it projects out of the rear of the station wagon through the tailgate door. In the embodiment illustrated in FIG. 1, the drawer unit includes a planar countertop 34 and paired drawers 36 which slidingly fit under it. An alternate embodiment of the drawer unit 30a is shown in FIG. 4 as having a hinged top 38 which covers an open storage cavity 40. A third embodiment, of the drawer unit 30b, shown in FIG. 5, provides a shorter countertop 42 along with a sink 44 and a camp stove 46. Further embodiments of the drawer unit providing other features are possible in many varied combinations.

Since station wagons come in many sizes, a second embodiment of the invention, shown in FIGS. 6, 7 and 8, has frame elements 16a with longitudinal and transverse extension means for lengthening or shortening them and for raising or lowering their upper edges. Also in this embodiment, the spacer member has spreading means for varying the amount of separation between the frame elements.

In this regard the frame elements comprise upper and lower tubular L-shaped primary rails 48 which are interconnected at their short legs by first collars 50, and upper and lower tubular L-shaped secondary rails 52 which are interconnected at their short legs by second collars 54. The collars have smaller diameters than their respective rails so that the rails telescope into them. Also the second rails have a smaller diameter than the first rails so that they also telescope with respect to each other. Accordingly, the frame elements can be dimensionally varied in either direction, and bolts 56, which fit through one of a series of openings passing through each mating set of frame elements where they interfit, allow fixing the frames at any desired size.

In this embodiment the spacer member comprises paired telescoping bars 58 which are releasably attached to adjustable brackets 60, which in turn are attached to the primary rails 48. Ties 62 diagonally interconnect the bars 58, and cross rods 63 diagonally interconnect each primary rail to its opposed secondary rail to add rigidity.

The frame elements are secured to the floor 19 of the station wagon by clips 64. However, to allow lifting of the frame elements in unison, hinges 66 are attached to the second collars 54 and to floor 19.

The pillows 22a, 22b and 26 are attached to pins 24 and 28 and springs 23 in the same manner as they are in the prior embodiment. However, while this embodiment of the invention allows one set of frame elements and spacer member to be used for a wide variety of station wagon sizes, the pillows are not adjustable, and pillows having the appropriate size for the particular station wagon must be utilized.

In operation both embodiments of the invention are used in the same manner. However, in the second embodiment of the invention the frame members 16a and the spacer member 58 must first be adjusted to the appropriate size. Thereafter the frame elements are placed in the rear portion of the station wagon and secured either by turn buckles 21 or clips 64. The rear pillow 22 then is installed by placing both portions of it on top of the frame elements and securing them with springs 43. It will be noted that while the springs allow a great deal of flexibility in shifting the pillow portions when lifting them, they cooperate with pins 24 to fix the pillow quite securely to the frame elements. Thereafter drawer unit 30 is installed onto tracks 32 and is placed in its closed position between the frame elements.

Luggage and camping equipment can now be placed under the bed without the necessity of completely removing the rear pillow. In addition, since all the items stored beneath the rear portion 22a of the rear pillow are in the drawer unit, access to the well 20 in the station wagon is not impaired, and by extending the drawer unit to its extended position, and by lifting rear portion 22a access to the well is readily available. Accordingly, once the bed is installed it does not have to be disturbed for any reason.

When the bed is to be used, assuming that the rear seat has been in its erected position, the rear seat is folded downwardly and the forward pillow placed between the forward extremities of the frame elements and the rear seat, to fully extend the bed between the tailgate and the back surface of the front seat. If the rear seat is not needed, the forward pillow can be left in this position at all times and the floor of the station wagon under it also used for storage.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A combination bed and storage unit for a station wagon having a tailgate door, a front seat, and a rear seat which is movable between a raised and a folded position, said unit comprising:
  (a) paired, spaced apart, upstanding elongate frame elements which extend between said tailgate door and said rear seat of said station wagon adjacent to the side walls thereof;
  (b) a spacer member interconnecting said frame elements at the bottom edge thereof;
  (c) a rear pillow which spans said frame elements between the upper edges thereof over substantially their entire length;
  (d) said rear pillow being divided into front and rear portions, each of said portions covering substantially one-half of the longitudinal extent of said frame elements; and (e) hinge means releasably pivotally securing each of said rear pillow portions independently to said frame elements for allowing each of said pillow portions to be pivoted to a raised position independently of the other of said pillow portions to provide access therebelow, and for allowing each of said pillow portions to be removed from said frame elements independently of the other of said pillow portions.

2. The unit of claim 1 wherein said hinge means comprises elastically expandable coil springs, each of said springs being releasably attached at one end thereof to one of the ends of said rear pillow portions, and at the other end thereof to one of said frame elements.

3. The unit of claim 1 wherein the other ends of said rear pillow portions contain bores along the side margins thereof, and including pins projecting upwardly from the upper edges of said frame elements which are arranged to mate with said bores.

4. The unit of claim 1 including a front pillow having the same width as said rear pillow, and releasably attached at the rear portion thereof to the forward extremities of said frame elements, and releasably attached at the forward edge thereof to the front seat of said station wagon when said rear seat is in its folded position.

5. The unit of claim 4 wherein said front pillow has bores located along the edges thereof, and including pins, located in the forward extremities of said frame elements, which are arranged to mate within said bores.

6. The unit of claim 1 including a drawer unit slidingly mounted between said frame elements below said pillows, for movement between a closed position, entirely within said station wagon, and an open position, extending through said tailgate door, said drawer unit having a planar tabletop surface thereon, and including at least one drawer slidably mounted within said drawer unit so as to be slidably openable with respect to said drawer unit when said drawer unit is in both its closed position and its open position, without obstruction of said planar table top surface.

7. The unit of claim 1 wherein said frame elements include longitudinal extension means for lengthening and shortening said frame elements and transverse extension means for raising and lowering the upper edges of said frame elements, and said spacer members include spreading means for varying the amount of separation between said frame elements.

8. A combination bed and storage unit for a station wagon having a tailgate door, a front seat, and a rear seat which is movable between a raised and a folded position, said unit comprising:

(a) paired, spaced apart, upstanding, elongate frame elements which extend between said tailgate door and said rear seat of said station wagon adjacent to the side walls thereof;

(b) a spacer member interconnecting said frame elements at the bottom edges thereof;

(c) said frame elements including longitudinal extension means for lengthening and shortening said frame elements, and transverse extension means for raising and lowering the upper edges of said frame elements, and said spacer member including spreading means for varying the amount of separation between said frame elements; and (d) pillow means which span said frame elements between the upper edges thereof over substantially their entire length.

* * * * *